United States Patent
Mori et al.

(10) Patent No.: US 10,982,981 B2
(45) Date of Patent: Apr. 20, 2021

(54) MARKING SYSTEM AND MARKING DEVICE

(71) Applicant: Hitachi, Ltd., Tokyo (JP)

(72) Inventors: Shunsuke Mori, Tokyo (JP); Kohhei Aida, Tokyo (JP); Masahiro Kawasaki, Tokyo (JP); Yuya Tokuda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/500,753

(22) PCT Filed: Mar. 6, 2018

(86) PCT No.: PCT/JP2018/008584
§ 371 (c)(1),
(2) Date: Oct. 3, 2019

(87) PCT Pub. No.: WO2018/186094
PCT Pub. Date: Oct. 11, 2018

(65) Prior Publication Data
US 2020/0056908 A1 Feb. 20, 2020

(30) Foreign Application Priority Data

Apr. 5, 2017 (JP) .................................. 2017-075029

(51) Int. Cl.
*G06F 17/00* (2019.01)
*G06F 7/00* (2006.01)
(Continued)

(52) U.S. Cl.
CPC ............... *G01D 7/005* (2013.01); *B41M 5/28* (2013.01); *G06K 7/1413* (2013.01);
(Continued)

(58) Field of Classification Search
USPC .................... 235/375, 376, 462.01, 494, 385
See application file for complete search history.

(56) References Cited

U.S. PATENT DOCUMENTS 6,042,264 A * 3/2000 Prusik ..................... G01K 3/04
116/219
2002/0026002 A1 2/2002 Tamura et al.
(Continued)

FOREIGN PATENT DOCUMENTS

JP 2001-348568 A 12/2001
JP 3086000 U 3/2002
(Continued)

OTHER PUBLICATIONS

International Search Report (PCT/ISA/210) issued in PCT Application No. PCT/JP2018/008584 dated Apr. 17, 2018 with English translation (four (4) pages).
(Continued)

*Primary Examiner* — Tuyen K Vo
(74) *Attorney, Agent, or Firm* — Crowell & Moring LLP

(57) ABSTRACT

This marking system is provided with: a marking device which has a marking unit which gives a mark for managing the quality of a product, a housing part which houses one or more temperature indicating materials, and a providing unit which provides, to the marking unit, a temperature indicating material selected by the housing part; and a control device which has a storage unit that stores temperature-indicating material information on a developing temperature or/and a decoloring temperature of each of the temperature-indicating materials included in the housing part; and a processing unit that acquires, from a server or an input unit, an appropriate temperature of the product, selects, on the basis of the acquired appropriate temperature of the product and the temperature-indicating material information, a temperature-indicating material, and notifies the providing unit of details of providing the selected temperature-indicating material.

9 Claims, 10 Drawing Sheets

(51) Int. Cl.
*G06Q 30/00* (2012.01)
*G06Q 90/00* (2006.01)
*G01D 7/00* (2006.01)
*B41M 5/28* (2006.01)
*G06K 7/14* (2006.01)
*G06K 19/06* (2006.01)

(52) U.S. Cl.
CPC ..... *G06K 7/1417* (2013.01); *G06K 19/06028* (2013.01); *G06K 19/06037* (2013.01)

(56) References Cited

U.S. PATENT DOCUMENTS

| | | | | |
|---|---|---|---|---|
| 2006/0121229 A1* | 6/2006 | Nagae | .................. | G01K 11/12 428/40.1 |
| 2010/0012018 A1* | 1/2010 | Ribi | ..................... | C09B 57/10 116/207 |
| 2010/0269454 A1* | 10/2010 | Reddersen | ........... | B65C 9/0015 53/411 |
| 2012/0105566 A1* | 5/2012 | Ishii | ........................ | B41J 2/32 347/217 |
| 2013/0188207 A1* | 7/2013 | Shiohara | ............. | G06F 3/1206 358/1.9 |
| 2013/0340885 A1 | 12/2013 | Clayton et al. | | |
| 2015/0085276 A1* | 3/2015 | Uchino | .................. | D06H 1/02 356/73 |
| 2016/0083600 A1* | 3/2016 | Sasaki | ....................... | B41J 2/02 428/207 |

FOREIGN PATENT DOCUMENTS

| | | |
|---|---|---|
| JP | 2002-310809 A | 10/2002 |
| JP | 2004-142758 A | 5/2004 |
| JP | 2006-150735 A | 6/2006 |
| JP | 2006-317384 A | 11/2006 |
| JP | 2010-526386 A | 7/2010 |
| WO | WO 2007/129316 A2 | 11/2007 |

OTHER PUBLICATIONS

Japanese-language Written Opinion (PCT/ISA/237) issued in PCT Application No. PCT/JP2018/008584 dated Apr. 17, 2018 (six (6) pages).
Japanese-language Office Action issued in Japanese Application No. 2017-075029 dated Oct. 6, 2020 with English translation (15 pages).

* cited by examiner

FIG.2

| CODE | PRODUCT NAME | PRODUCTION DATE (yy.mm.dd) | DELIVERY DEADLINE (yy.mm.dd) | SIZE (W×D×H) | PRICE (?) | SURFACE COLOR TONE (L*a*b*) | NECESSITY OF TEMPERATURE MANAGEMENT | APPROPRIATE TEMPERATURE | MARKING POSITION |
|---|---|---|---|---|---|---|---|---|---|
| 4512345678906 | AA1 | 16.12.01 | 17.12.01 | 200×150×300 | 3,000 | 32.8, −5.0, 0.5 | NECESSARY | 2~10°C | BESIDE BARCODE |
| 4512345678913 | BB1 | 16.11.06 | 17.09.06 | 350×200×500 | 7,500 | 10.5, 10.3, −20.2 | NECESSARY | 0~20°C | UPER OUTER SURFACE |
| 4512345678920 | CC1 | 16.11.28 | 17.05.28 | 200×200×300 | 2,500 | 86.2, 0.2, 0.3 | UNNECESSARY | | |
| 4512345678937 | DD1 | 16.12.01 | 17.01.31 | 210×240×500 | 1,230 | 53.4, −15.3, 2.2 | NECESSARY | ≦8°C | ONE SPECIFIED |
| 4512345678944 | DD2 | 16.11.01 | 17.12.31 | 210×240×500 | 1,230 | 53.4, −15.3, 2.2 | NECESSARY | ≦8°C | ONE SPECIFIED |
| 4512345678951 | EE1 | 16.11.23 | 17.11.23 | 120×150×200 | 1,000 | 34.5, 0.5, 10.5 | NECESSARY | ≧15°C | BESIDE BARCORDE |

221

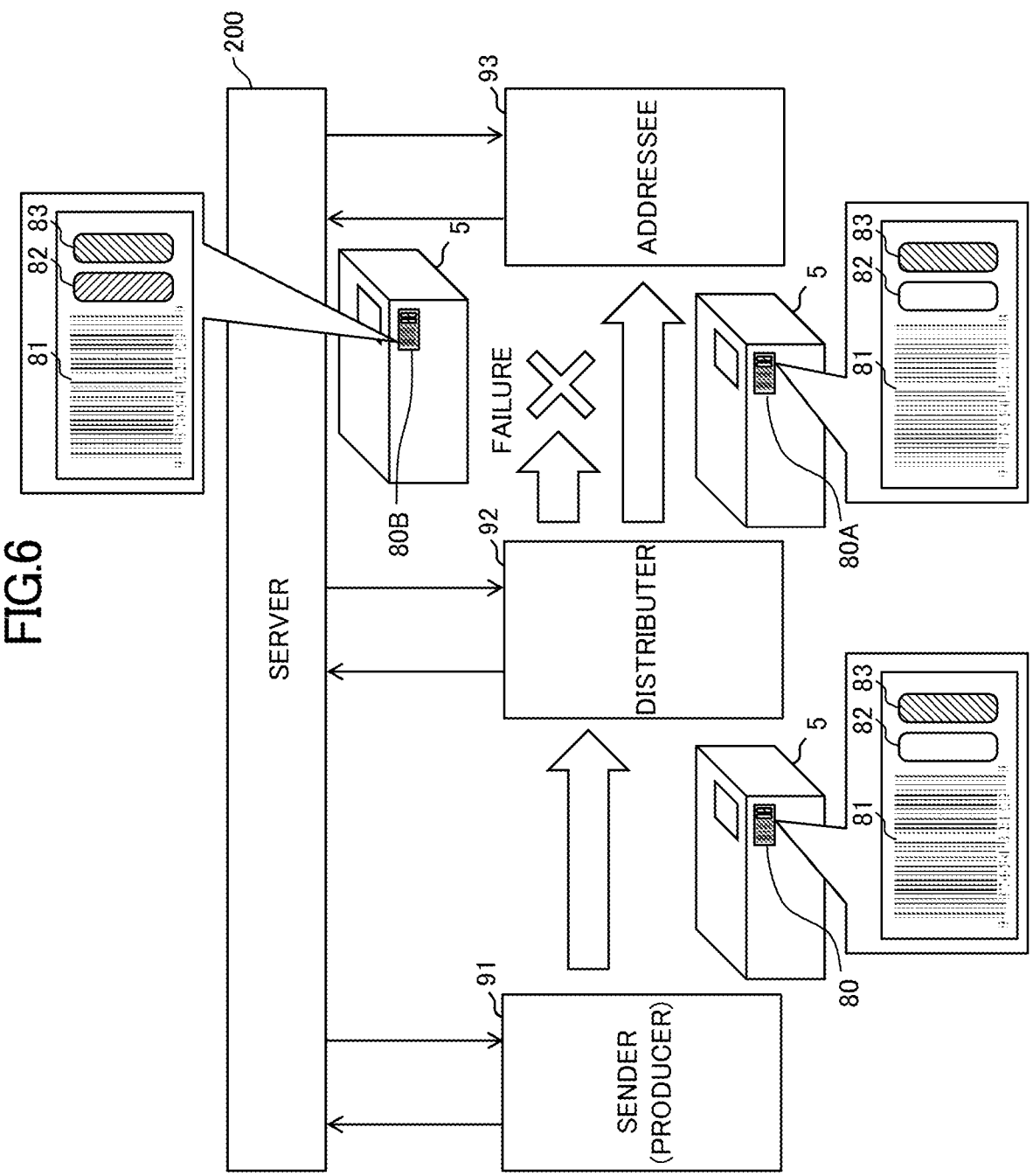

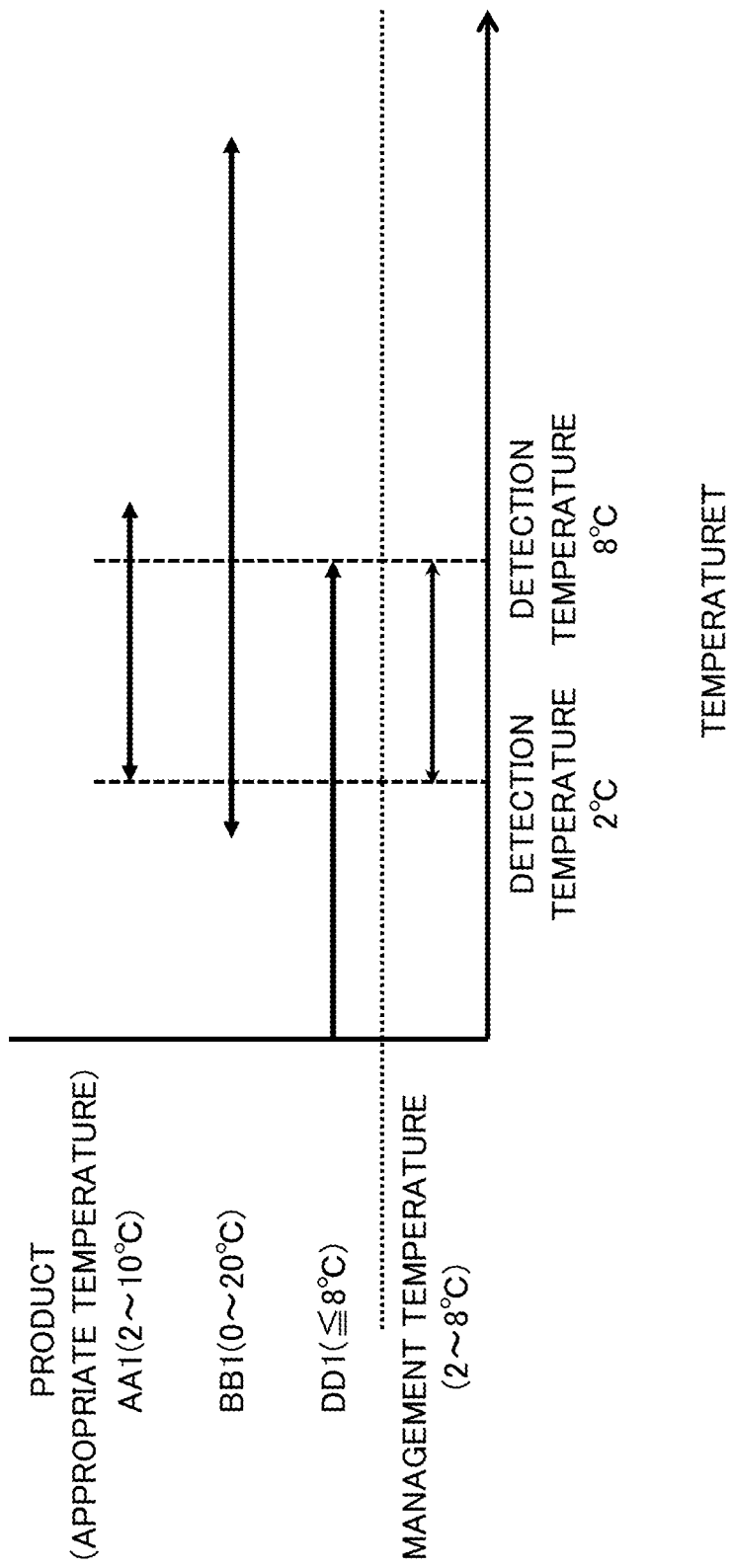

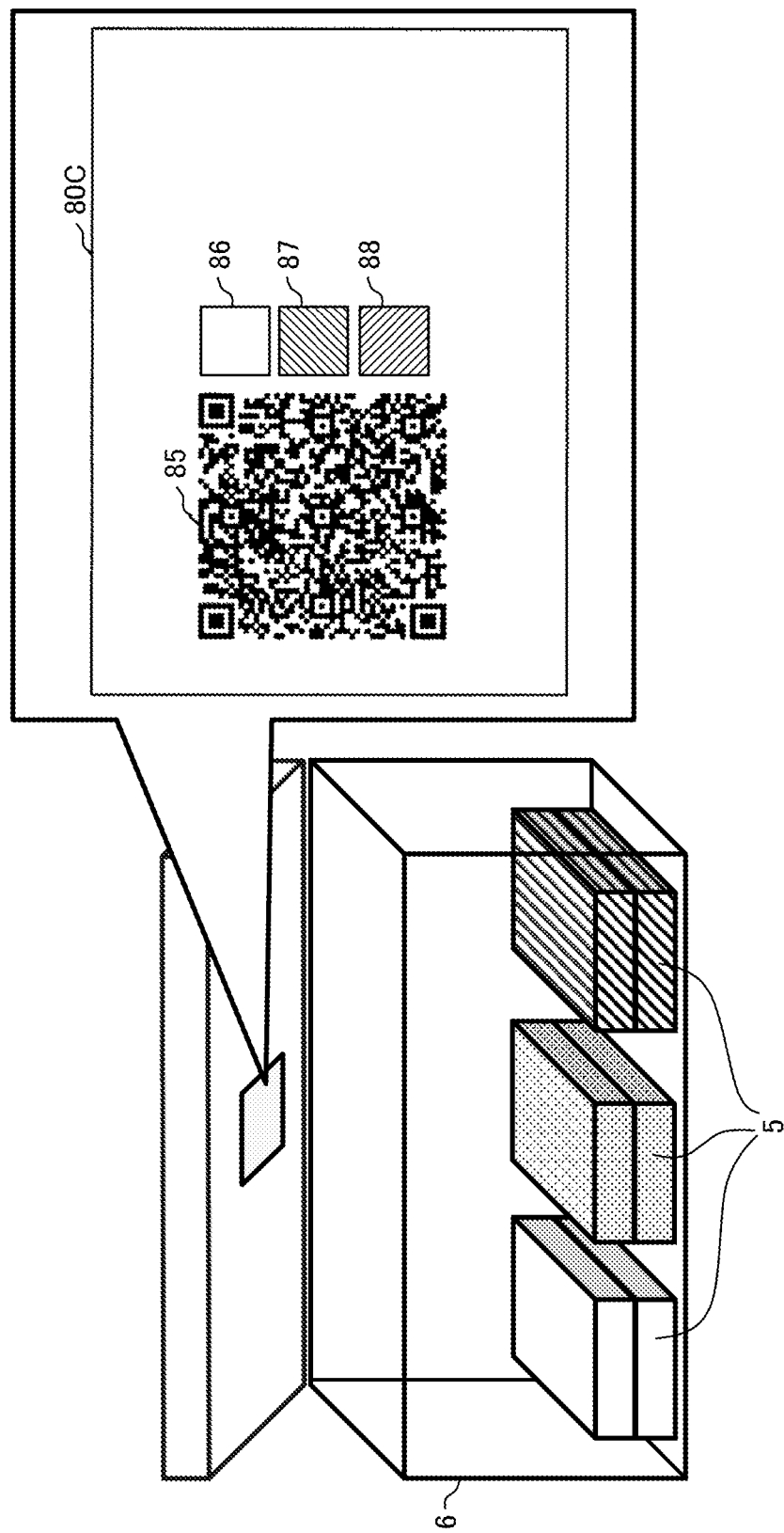

MARKING SYSTEM AND MARKING DEVICE

TECHNICAL FIELD

The present invention relates to a marking system and a marking device to apply a quality control mark of a product.

BACKGROUND ART

Some of products transported via various distribution channels from production sites or physical distribution complexes are necessary to be appropriately managed to maintain the qualities of the products. For example, some food becomes inappropriate for consumption due to decomposition or a change in shape occurring under high- or low-temperature environment.

To meet such a problem, when a product is transported or stored, management measures are performed, such as housing of the product in a thermal insulation container, and temperature management of a transportation container, a transportation track, a storage warehouse, or a storage facility using an air conditioner. However, an environmental state of the product may be deviated from a management range (preferable environmental condition) due to factors such as inadequate management including failure of a device or non-performance of an operating procedure, unsteady weather, and delay.

Hence, a quality control code is applied to the product, and a state of the code is read and analyzed to analyze quality or management of the product to know that the environmental state of the product is deviated from the management range.

Patent literature 1 discloses a system, in which a temperature-indicating mark including a temperature-indicating material is applied to a quality control code, temperature of the product and a relevant quality state are detected using a barcode reader in a distribution process, and such data are input and printed by a printer to allow management history of the product to be checked.

CITATION LIST

Patent Literature

Patent Literature 1: Japanese Unexamined Patent Application Publication (Translation of PCT Application) No. 2010-526386.

SUMMARY OF INVENTION

Technical Problem

Some of products transported from production sites or physical distribution complexes must be subjected to temperature management for maintenance of quality, but an appropriate temperature condition is typically different for each product. For example, foods, including frozen foods, chilled foods, daily foods such as fresh foods, boxed lunches, and breads, constant-temperature foods, dairy products, confectionary, and alcoholic beverages, are different in appropriate temperature condition for quality or the like. Further, drugs and medicines are required to be transported under strict temperature management so as not to be deviated from the appropriate temperatures in a distribution process. In transportation or storage in a distribution process, since a management form of the products varies from a single item to a unit load such as packing in a corrugated cardboard or a warming container, the appropriate management temperature condition may also vary in correspondence to such a variation in management form.

Although temperature management is performed in the distribution process in correspondence to the appropriate temperature of the product, the management temperature is different for each distribution process or each physical distribution complex depending on air conditioner units or storage methods. Further, in the distribution process, products having different appropriate management temperatures may be packed into a unit load, or may be loaded together for transportation or storage. Great effort has been therefore required to individually apply an appropriate quality control mark to each product.

An object of the invention, which is to solve the above-described problem, is to provide a marking system and a marking device, in each of which a temperature-indicating material suitable for a product is applied to the product so that distribution management of the product is achieved.

Solution to Problem

To achieve the object, a marking system of the invention includes: a marking device which includes a marking unit that applies a quality control mark of a product, a housing unit that houses at least one temperature-indicating material, and a providing unit that supplies a temperature-indicating material selected from the housing unit to the marking unit; and a controller which includes a storage storing temperature-indicating material information on color-developing temperature and/or decoloring temperature of each temperature-indicating material contained in the housing unit, and a processor that acquires appropriate temperature of the product from a server or an input unit, selects a temperature material based on the acquired appropriate temperature of the product and the temperature-indicating material information, and informs the providing unit of supply of the selected temperature-indicating material. Other aspects of the invention are described in some embodiments as mentioned later.

Advantageous Effects of Invention

According to the invention, a temperature-indicating material suitable for a product is applied to the product so that distribution management of the product is achieved.

BRIEF DESCRIPTION OF DRAWINGS

FIG. 2 shows an example of product information stored in a server of the first embodiment.

FIG. 4A shows a case of upper-and-lower limit management, FIG. 4B shows a case of lower-limit management, and FIG. 4C shows a case of upper-limit management.

FIG. 6 schematically shows a management form of a product in distribution of the product.

FIG. 7 shows a relationship between appropriate temperatures of a plurality of products, management temperature of the products, and detection temperature of a temperature-indicating material selected by marking, in a second embodiment.

FIG. 8A is a schematic view showing a state of a temperature-indicating ink 8 in a colored state, in which a non-color-developing material holds a composition including a Leuco dye, a color-developing agent, and a decolorant. FIG. 8B is a schematic view showing a state of a temperature-indicating ink in a decolored state, in which a non-color-developing material holds a composition 65 including the leuco dye, the color-developing agent, and the decolorant. FIGS. 8C and 8D are each a schematic view showing a state of the temperature-indicating ink, in which the non-color-developing material and the composite form a continuous body, where FIG. 8C shows a colored state, and FIG. 8D shows a decolored state.

FIG. 10 shows an example of a barcode for one packing management according to a fifth embodiment.

DESCRIPTION OF EMBODIMENTS

Some embodiments for carrying out the invention are now described in detail while appropriately referring drawings.

First Embodiment

Figure 1:
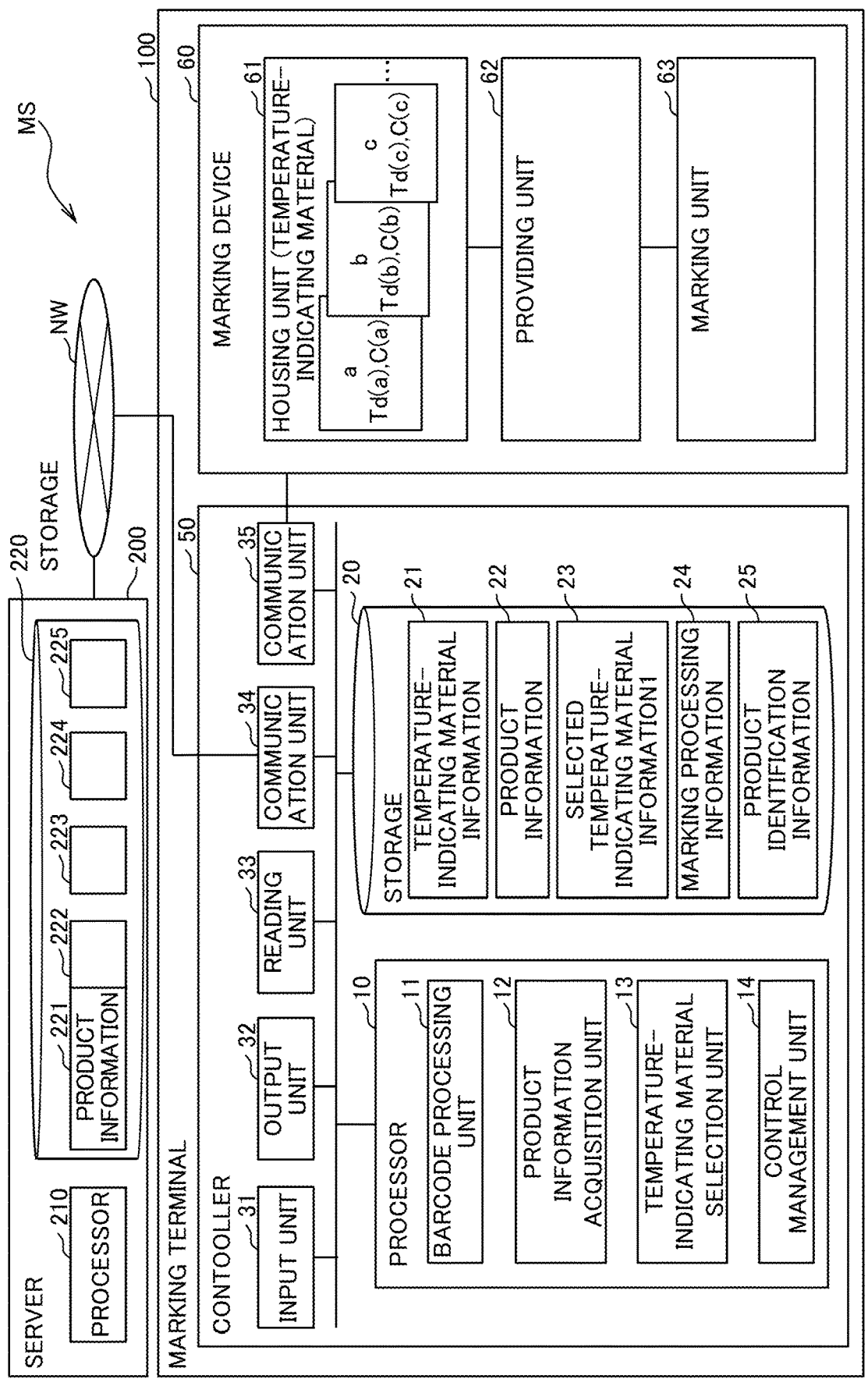
FIG. 1 shows a configuration of a marking system of a first embodiment.

FIG. 1 shows a configuration of a marking system MS of a first embodiment. The marking system MS of the invention includes a marking terminal 100 and a server 200. The marking terminal 100 includes a controller 50 and a marking device 60. In the marking terminal 100 of the first embodiment, the marking device 60 is integrated with the controller 50, achieving a small and portable shape or structure in light of operability of an operator in marking operation. The marking terminal 100 is described in detail with reference to FIG. 3. The marking terminal 100 and the server 200 are communicatively connected together via a network NW.

Marking Device

The marking device 60 of the first embodiment uses a temperature-indicating seal, which changes color at a detection temperature, as a temperature-indicating material, and includes a housing unit 61 that houses a plurality of temperature-indicating materials having different detection temperatures or display colors, a marking unit 63 that attaches the temperature-indicating seal to a product to be managed, and a providing unit 62 that supplies the temperature-indicating material from the housing unit 61 to the marking unit 63. The first embodiment uses a seal pasting machine as the marking unit 63.

The temperature-indicating seal as the temperature-indicating material of the first embodiment is an irreversible temperature-indicating seal that does not return to an original color when it changes color at a predetermined temperature, or a reversible temperature-indicating seal that returns to an original color at a predetermined condition even if it changes color at a predetermined temperature. In the first embodiment, a color tone is changed at a predetermined temperature between a colored state and a decolored or colorless state. Such color-tone change temperature is set to upper- or lower-limit temperature, making it possible to determine whether the upper limit or the lower limit of the management temperature is exceeded by whether a color tone is changed during management of a product and the like.

Control Unit

The controller 50 of the first embodiment includes a processor 10, a storage 20, an input unit 31 to input operation information on marking, an output unit 32 to output a read result and a marking result, a reading unit 33 to read a barcode, a communication unit 34 to communicate with the server 200 via the network NW, and a communication unit 35 to communicate with the marking device 60. In the first embodiment, a lithium secondary battery is used as a power source of the marking terminal 100 in consideration of operability of marking operation, portability, and environmental friendliness.

The processor 10 includes a barcode processor 11 that stores product identification information 25, read by the reading unit 33, into the storage 20, a product information acquisition unit 12 that acquires product information containing appropriate temperature of a product from the server 200 based on the read product identification information, a temperature-indicating material selection unit 13 that selects a temperature-indicating material based on the appropriate temperature of the product and temperature-indicating material information 21, and a control management unit 14 that informs the providing unit 62 via the communication unit 35 of supply of the selected temperature-indicating material.

The storage 20 stores the temperature-indicating material information 21 (for example, temperature-indicating material identification information, detection temperature Td, color tone C) housed in the housing unit 61 of the marking device 60, product information 22 acquired from the server 200, selected temperature-indicating material information 23 as a selection result of a temperature-indicating material applied to a product to be managed by the temperature-indicating material selection unit 13, marking processing information 24 to store output to the marking device when a marking instruction is issued to a product and the marking results, and the product identification information 25 read by the reading unit 33.

The reading unit 33 executes various detection methods depending on objects for identification applied to the products to be managed. When a barcode is applied, an infrared barcode detector is used. An image detector using a camera or the like is used for a two-dimensional code such as QR Code™ or a product itself. A special reader such as an RFID system is used for an electronic tag (for example, RF tag). In the first embodiment, a CCD camera is used as a detector for the reading unit 33 to read product information of the barcode and color and optical information of the temperature-indicating material.

The output unit 32 outputs information of a product to be managed and relevant information, management temperature, color, and a marking position of the temperature-indicating material applied to the product, success or failure of marking, the number of times of marking, the number of processed products, the number of temperature-indicating materials remaining in the marking device, and information on a device state such as malfunction or trouble. The first embodiment uses a display device as the output unit 32, so that the above-described results are output and displayed, allowing operators to check the results. A record medium such as a semiconductor memory may be connected for output and record of the results. This further allows information to be transferred to another information processor via the record medium and processed therein, or to be output to another display device and displayed thereon.

The storage 20 includes synchronous dynamic random access memory (SDRAM), electrically erasable programmable read-only memory (EEPROM™), and SD memory card. The processor 10 is achieved by executing a program in a memory by a central processor (CPU).

Server

The server 200 of the first embodiment swaps information with the communication unit 34 of the controller 50. The server 200 includes a processor 210 and a storage 220. The storage 220 of the server 200 stores detailed information of each product to be managed (for example, the product information 221, delivery condition information 222, marking information 223, delivery management information 224, and production information 225), and outputs such information to the communication unit 34 of the controller 50 in response to received information on read results. Marking results output by the controller 50 are recorded and stored in the server 200.

FIG. 2 shows an example of product information stored in the server 200 of the first embodiment. The product information 221 as information of a product to be managed includes a code (product identification information), name (product name), production date, delivery deadline date, size, price, surface color tone, necessity of temperature management on marking of the temperature-indicating material, appropriate temperature, and a marking position.

For example, when the product name is "AA1", the necessity of temperature management is "necessary", the appropriate temperature is "2 to 10° C.", and the marking position is "beside barcode". When the product name is "BB1", necessity of temperature management is "necessary", the appropriate temperature is "0 to 20° C.", and the marking position is "upper outer surface". In the case of such a product, an operator in charge of distribution uses the marking terminal 100 to apply a quality control mark of the product to a designated marking position because the necessity of temperature management is "necessary".

The marking information 223 includes the following data in connection with the product identification information as the marking results to be recorded and stored, that is, execution time of each of read and marking, place, whether the temperature-indicating material is applied to a product that has been read, management temperature of the product, a type, the number, color change temperature, and color change of the applied temperature-indicating material, and a marking position on the product.

Such information is managed, received, or output by a producer, a deliverer, and a distributer of the product.

Figure 3:
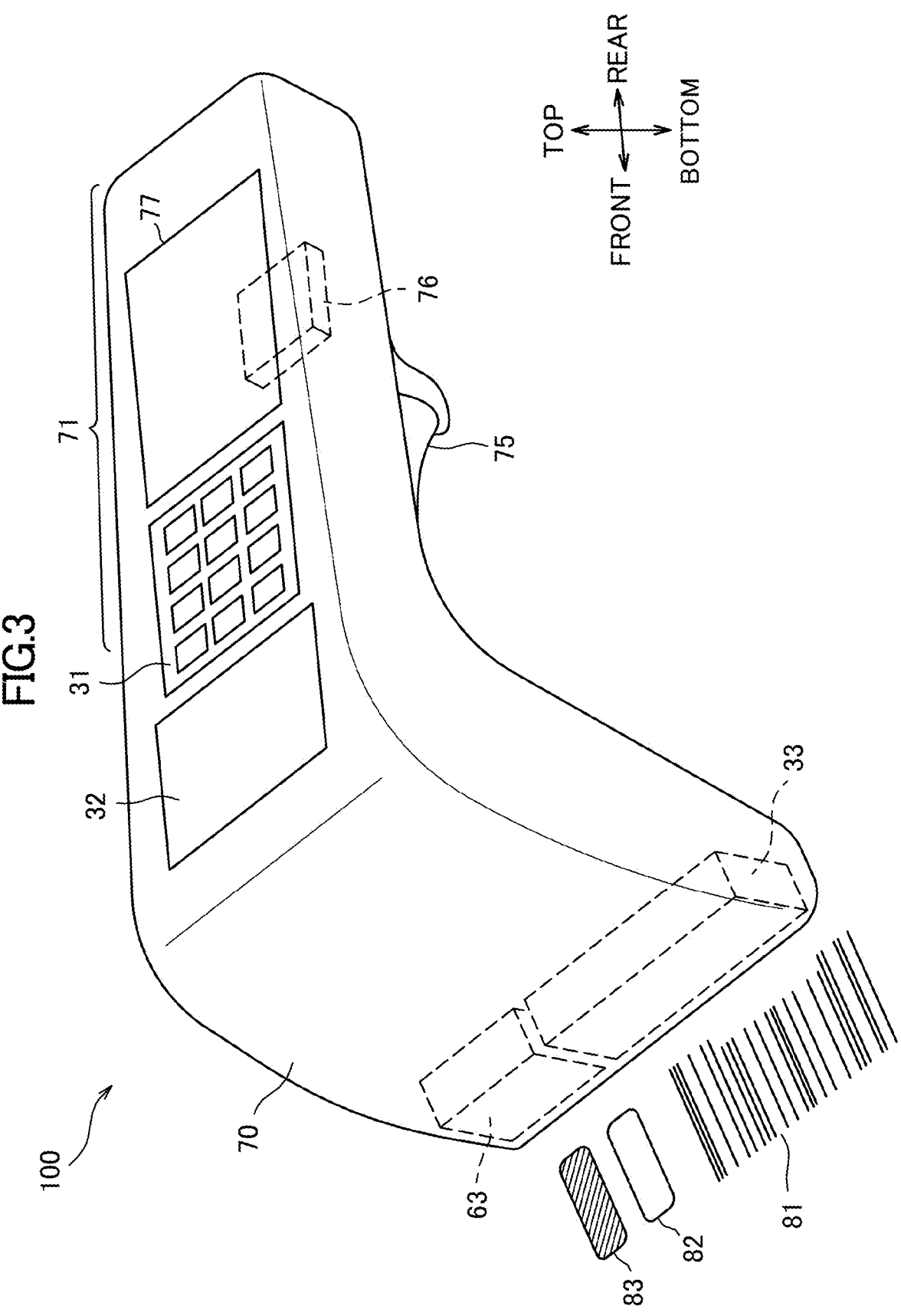
FIG. 3 shows appearance and a configuration of a marking terminal of the first embodiment.

FIG. 3 shows appearance and a configuration of the marking terminal 100 of the first embodiment. FIG. 1 is appropriately referred. The marking terminal 100 includes a casing 70 of which the upper surface has thereon a display device as the output unit 32 and the input unit 31 to input numerals or letters. A lid 77 of the housing unit 61 for the temperature-indicating material is provided on the upper surface of a handle portion 71 of the casing 70, and the lid 77 can be opened to supply the temperature-indicating material. A switch 75 for reading a barcode (for example, one-dimensional barcode 81) by the reading unit 33, and a push button 76 for attaching a temperature-indicating seal (for example, temperature-indicating seal 82 or 83 (quality control mark)) by the marking unit 63 are provided on the lower surface of the handle portion 71. The push button 76 is designed so as not to project from the lower surface of the handle portion 71. The reason for this is to prevent an operator from erroneously attaching the temperature-indicating seal by the marking unit 63.

Marking Method

In the first embodiment, a barcode is beforehand applied to a product to be managed to allow the product to be specified. An operator reads the barcode on the product to be managed, and applies the quality control mark to a specified position of the product. A detailed process is described below. FIGS. 1 to 3 are appropriately referred.

The operator reads the barcode applied to the product to be managed by the reading unit 33 of the marking terminal 100. The barcode processor 11 stores the product identification information 25 into the storage 20, and sends the product identification information 25 to the server 200 via the communication unit 34. The server 200 specifies the product to be managed from the product identification information, and records and updates the history on reading, and sends, to the marking terminal 100, the product information 221 on the product to be managed and information on management of distribution, including storage and transportation, necessary for marking.

The information output from the server 200 is received by the temperature-indicating material selection unit 13 via the communication unit 34 of the controller 50. The temperature-indicating material selection unit 13 selects a temperature-indicating material for marking suitable for distribution including storage and transportation of the product to be managed among from the housed temperature-indicating materials, based on various types of information from the server 200, such as necessity of temperature management of the product to be managed, approximate temperature, size and a shape, a marking position, and color of the marking, and based on the temperature-indicating material information 21, housed in the housing unit of the marking device, stored in the storage 20.

With a color tone of the temperature-indicating material to be selected, when visibility or detectability of the temperature-indicating material is required, the temperature-indicating material preferably has a color tone of high color purity in a colored state, a color tone in complementary relation to a color of a product at the marking position, or a color tone having a lightness difference from a color tone of the product. When low visibility is required, the temperature-indicating material preferably has a small chromaticity difference $\Delta a^*$, $\Delta b^*$ or a small lightness difference $\Delta L^*$ in the CIE $L^*a^*b^*$ color system, such as a similar color as a color of the product at the marking position.

Figure 4A:
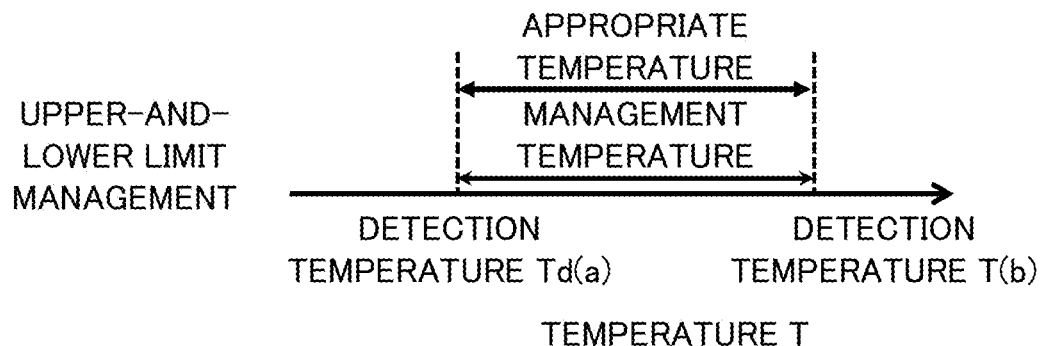
FIGS. 4A to 4C each show a relationship between appropriate temperature of a product, management temperature of the product, and detection temperature of a temperature-indicating material selected by marking, where
Figure 4B:
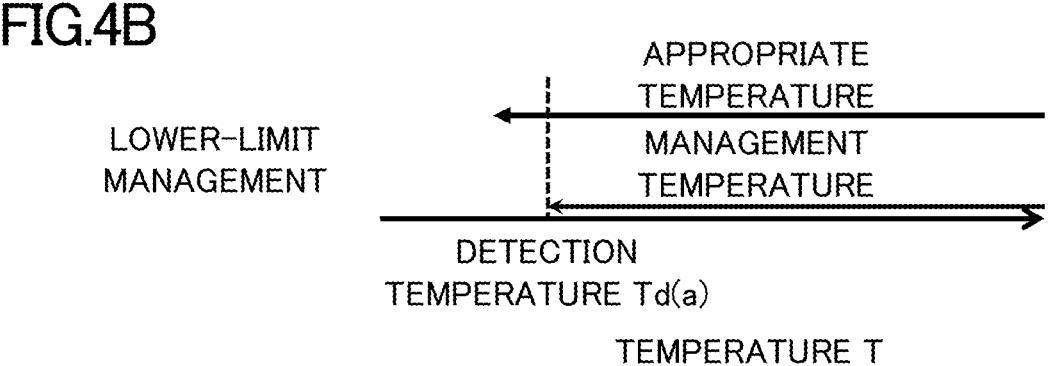
Figure 4C:
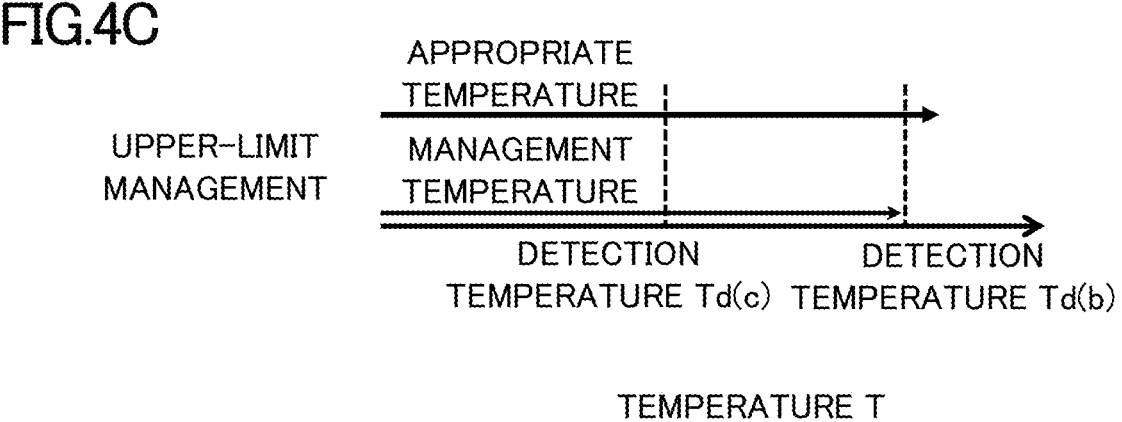

FIGS. 4A to 4C each show a relationship between appropriate temperature of a product, management temperature of the product, and detection temperature of the temperature-indicating material selected by marking, where FIG. 4A shows a case of upper-and-lower limit management, FIG. 4B shows a case of lower-limit management, and FIG. 4C shows a case of upper-limit management. In the case of the upper-and-lower limit management of FIG. 4A, the appropriate temperature and the management temperature are in the same temperature range. The temperature-indicating material is therefore selected based on the lower-limit detection temperature $Td(a)$ and the upper-limit detection temperature $Td(b)$. In the case of the lower-limit management of FIG. 4B, the management temperature has a value equal to or higher than a value obtained by adding a certain margin to the appropriate temperature. The temperature-indicating material is therefore selected based on the lower-limit detection temperature Td(a). In the case of the upper-limit management of FIG. 4C, the management temperature has a value equal to or lower than a value obtained by subtracting a certain margin from the appropriate temperature. The temperature-indicating material is therefore selected based on the upper-limit detection temperature Td(b).

The temperature-indicating material selection unit 13 selects a product to be marked with the temperature-indicating material based on information from the server 200, i.e., the necessity of temperature management of each product to be managed. Whether the upper-and-lower limit management of FIG. 4A, the lower-limit management of FIG. 4B, or the upper-limit management of FIG. 4C is determined depending on the appropriate temperature of the product, and a temperature-indicating material, having a detection temperature close to the upper- or lower-limit temperature within a condition of each management temperature, is selected.

The selection results of the temperature-indicating material for marking by the temperature-indicating material selection unit 13 is sent to the marking device 60 via the control management unit 14 and the communication unit 35. The control management unit 14 sends, to the display device of the output unit 32, commodity information of the product to be managed, and information on the temperature-indicating material for marking, and information on the marking position. Consequently, a marking operator can visually check the product to be managed, the temperature-indicating material for marking on the product, and a marking position.

In the marking device 60, the temperature-indicating material is selected from the housing unit 61 based on the information on the temperature-indicating material for marking received from the control management unit 14, and the providing unit 62 supplies the temperature-indicating material to the marking unit 63, and when an operator presses the push button 76, the product to be managed is marked.

In the first embodiment, the temperature-indicating material is a temperature-indicating seal, which changes a color tone at each detection temperature and is attached to the product by a seal pasting machine to detect deviation of the management temperature from the upper or lower limit. Several types of temperature-indicating materials, between which detection temperature or a detection method is different, may be applied to detect reaching temperature in detail within or outside the management temperature.

The operator moves the marking unit 63 of the marking device 60 such that marking with the temperature-indicating material can be performed at the certain marking position output on the display device, and presses the push button 76 when marking is enabled. The temperature-indicating seal as the temperature-indicating material is then received by the marking device 60 via the control management unit 14 and applied for marking on the product to be managed by the marking unit 63.

Figure 5:
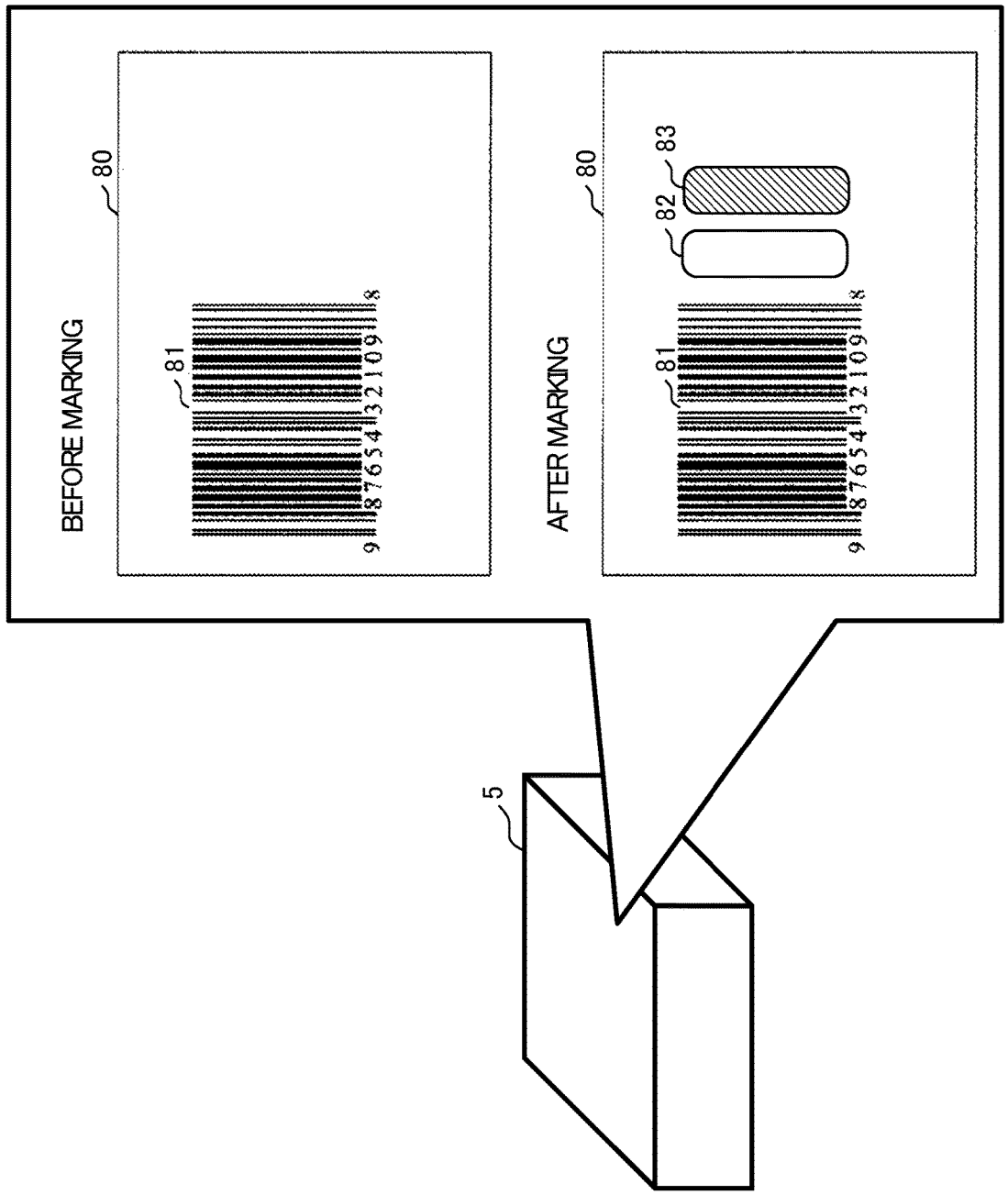
FIG. 5 shows examples of marking a temperature-indicating material for temperature management in connection with a one-dimensional barcode, where the upper right side of the figure shows a label before marking, and the lower right side of the figure shows the label after marking.

FIG. 5 shows examples of marking with the temperature-indicating material for temperature management in connection with a one-dimensional barcode, where the upper right side of the figure shows a label 80 before marking, and the lower right side of the figure shows the label 80 after marking. The label 80 shown in the upper right side of the figure is attached to a product 5 while having a one-dimensional barcode 81 printed thereon. The lower right side of the figure shows a state where the temperature-indicating seals 82 and 83 (quality control marks) are attached using the marking terminal 100. The temperature-indicating seals 82 and 83 are attached next to the one-dimensional barcode 81 on the label 80.

Return to FIG. 1, after marking, the marking unit 63 outputs a signal indicating execution of marking to the control management unit 14. The control management unit 14 processes the information on the product to be managed and the information on the marking results, and sends such processed information to the server 200 via the display device of the output unit 32 and the communication unit 34 to record (memorize) the information in the server 200. With the marking results, the temperature-indicating material, which is applied for marking together with the barcode, may be read as image information by the detector of the reading unit 33 of the controller 50 and sent to the server 200 via the output unit 32 and the communication unit 34.

While marking processing has been described, an operator can grasp a state of the marking in a process from the server 200 to the product by the output unit (display device) of the marking terminal 100. Furthermore, a producer, a deliverer, and a distributer can also use the marking terminal 100 to easily perform input/output processing on the results of marking operation to the product to be managed.

Distribution Management with Temperature-Indicating Material

FIG. 6 schematically shows a management form of a product in distribution of the product. A product 5 to be managed marked with the temperature-indicating material is delivered (transferred) by a distributor 92 from a sender 91 to an addressee 93 via a process including transportation (transfer) and storage. The distributor 92 connects the marking terminal 100 and the like to the server 200 to acquire information on the appropriate temperature or management temperature of the product to be managed stored in the server 200, and transports the product to the addressee 93 while managing temperature or time during transportation according to such information.

The distributor 92 checks a color tone of the temperature-indicating material in the process such as transportation (transfer) or storage, thereby can visually check a temperature management state or a temperature load state of the product in each process. The distributor 92 may send, to the server 200, information on optical states and images of a product and a relevant temperature-indicating material, a reading position, and reading time in a process such as shipping, delivery, or storage so that the server 200 stores and manages such information together with the information on marking of the product 5. The detector of the reading unit 33 of the controller 50 is preferably used to read the optical state of the temperature-indicating material. Consequently, participants of distribution of the product 5 can acquire a state of the product to be managed in each distribution process with the color tone of the temperature-indicating material in numerical information, and can quantitively manage or share the information. The numerical information of the color tone includes the RGB color space, the HSV color space, and the Munsell color space in addition to the CIE color space such as L*a*b* and L*C*h. The distributor 92 may apply the temperature-indicating material for temperature management in correspondence to a transportation form, such as a unit load, of the product in distribution.

The addressee 93 can check a color tone state of the temperature-indicating material on a received product to visually check a temperature management state or a temperature load state of the product after the process including sending, transportation, and storage. Furthermore, the addressee 93 can connect to the server 200 via a terminal and the like to check the information on a stored product and management temperature or time before reception.

In FIG. 6, a color tone of the temperature-indicating seal 82 on a label 80B changes between the distributor 92 and the addressee 93, showing inadequate management in distribution. On the other hand, a color tone of each of the temperature-indicating seals 82 and 83 on a label 80A is the same as that of the temperature-indicating seal on the original label 80, showing adequate management in distribution.

The sender 91, the distributor 92, and the addressee 93 may hold the server 200 so that the management information in the first embodiment is dispersedly and identically recorded and managed. This makes it possible to prevent loss and falsification of the management information.

Second Embodiment

In a marking system of a second embodiment, a plurality of products to be managed are packed together and managed. In the marking system, respective configurations of the marking terminal 100 and the server 200 are the same as those of the first embodiment, but a marking method is different from that of the first embodiment (in particular, selection method of the temperature-indicating material). The marking method is described in detail below. Some of portions duplicating those in the first embodiment may not be described. FIG. 1 is appropriately referred.

Marking Method

In a marking method of the second embodiment, a plurality of different-type products to be managed are collectively managed through one packing or the like. An operator reads the barcode applied to the product to be collectively managed using the marking terminal 100, and sends the product identification information of each product to the server 200 via the communication unit 34. The server 200 specifies each product to be managed from the product identification information, determines validity of the product to be managed, records and updates history on reading, and sends, to the marking terminal 100, the product information on the product to be managed and information on management of distribution, including storage and transportation, necessary for marking.

The information output from the server 200 is received by the temperature-indicating material selection unit 13 via the communication unit 34 of the marking terminal 100. The temperature-indicating material selection unit 13 selects a product to be marked with the temperature-indicating material based on the information from the server 200, i.e., the necessity of temperature management of each product to be managed. Subsequently, with products having temperature management and appropriate temperatures, the temperature-indicating material selection unit 13 compares their appropriate temperatures to one another, and extracts a temperature condition, at which appropriate temperature ranges overlap one another, the upper-limit temperature, and the lower-limit temperature. The extracted temperature condition, upper-limit temperature, and lower-limit temperature are compared to the information, stored in the storage, of the temperature-indicating material housed in the housing unit of the marking device to select a temperature-indicating material, of which the color-tone change temperature is similar to the upper- or lower-limit temperature within the above temperature condition, is selected from among the housed temperature-indicating materials. The extraction of the temperature condition, the upper-limit temperature, and the lower-limit temperature may be performed by the server 200 instead of the processor 10 of the marking terminal 100. This makes it possible to reduce a load on the processor 10.

FIG. 7 shows a relationship between appropriate temperatures of a plurality of products, management temperature, and detection temperature of a temperature-indicating material selected by marking in the second embodiment. A case where products having product names AA1, BB1, and DD1 as shown in FIG. 2 are packed together is now described. For the product names AA1, BB1, and DD1, the necessity of temperature management is "necessary" for each product, while the appropriate temperature is "2 to 10° C." for the product name AA1, "0 to 20° C." for the product name BB1, and "8° C." for the product name DD1. With products having appropriate temperatures, the temperature-indicating material selection unit 13 compares their appropriate temperatures to one another, and extracts the upper-limit temperature (8° C.) and the lower-limit temperature (2° C.) between which the appropriate temperature ranges overlap each other, and determines the upper- and lower-temperatures as management temperatures.

In this way, it is possible to pack a plurality of products to be managed together and manage the products with a temperature-indicating material applied for marking at the same temperature condition. In addition, a management temperature condition can be known not only to a producer but also to a deliverer and a distributer via the server 200 and can be shared.

Third Embodiment

In a marking system of a third embodiment, respective configurations of the marking terminal 100 and the server 200 are the same as those of the first or second embodiment, but a marking method is different from that of the second embodiment. The marking method is described in detail below. Some of portions duplicating those in the first or second embodiment may not be described. FIG. 1 is appropriately referred.

Marking Method

In a marking method of the third embodiment, a plurality of different-type products to be managed are collectively managed through one packing or the like as with the second embodiment, but is different from the second embodiment in that a preferential product is selected from among the products and marked with a temperature-indicating material suitable for temperature management.

The temperature-indicating material selection unit 13 selects a product to be marked with the temperature-indicating material based on the information from the server 200, i.e., the necessity of temperature management of each product to be managed. Subsequently, with products having temperature management and appropriate temperatures, the temperature-indicating material selection unit 13 compares their appropriate temperatures to one another. If the appropriate temperature ranges do not overlap one another, the temperature-indicating material selection unit 13 sends order based on product information on each product, such as commodity price, storing temperature and distributable time and classification based on groups, of which the overlapping appropriate temperature ranges overlap one another, and combinations of the groups, to the output unit 32 for display. Consequently, an operator can select a product to be preferentially managed and determines a temperature condition based on the order and the classification, apply a temperature-indicating material satisfying the temperature condition to each product, pack products while sorting the products in accordance with the classification of the temperature condition, and select a temperature-indicating material suitable for temperature management of each package based on the temperature condition and apply the temperature-indicating material to each product.

In this way, it is possible to pack a plurality of products to be managed together, extract a product being preferential in management condition, and select a temperature-indicating material suitable for the product, and apply the temperature-indicating material for management.

Fourth Embodiment

In a fourth embodiment, the marking device 60 and a temperature-indicating material used for the marking device 60 are different from those in the first to third embodiments. The marking device 60 is described in detail below.

Marking Device

The marking device 60 of the fourth embodiment uses a temperature-indicating ink, which changes color at a detection temperature, as the temperature-indicating material, and includes a housing unit 61 that houses a plurality of temperature-indicating inks having different detection temperatures, display colors, or the like, a marking unit 63 that applies the temperature-indicating ink to a product to be managed for printing, and a providing unit 62 that supplies the temperature-indicating ink from the housing unit 61 to the marking unit 63. The marking device 60 may also have a stirrer to hold a dispersion state of the temperature-indicating ink as described later or a thermal insulation unit to omit initialization processing.

In the fourth embodiment, a stamping machine is used as the marking unit 63 to apply the temperature-indicating ink. The temperature-indicating ink is supplied onto an impression surface of a seal impression of the stamping machine, and printing is performed by stamping with the temperature-indicating ink on a product to be managed in accordance with the impression surface. The stamping machine has several types of seal impressions, and can select a seal impression based on information received from the control management unit 14 of the controller 50. The impression surface of the seal impression may have a letter, a numeral, or a geometric pattern.

The marking device 60 of the fourth embodiment may include a preparation unit that prepares constituent materials of the temperature-indicating ink to adjust a color tone or detection temperature as described later.

Temperature-Indicating Ink

The temperature-indicating ink of the fourth embodiment includes a composition containing a leuco dye, a color-developing agent, a decolorant, and a non-color-developing material as described below. A solvent may be added to dissolve such a composition, increase viscosity, and improve adhesion to the product to be managed.

The temperature-indicating ink changes its color density and optical characteristics based on color developing or decoloring at predetermined temperature of the leuco dye.

The leuco dye is made of an electron-donating compound, for example, a compound used as a dye for pressure sensitive copying paper or a dye for thermal paper.

Examples of the leuco dye include dyes of triphenylmethane phthalide series, fluoran series, phenothiazine series, indolyl phthalide series, leuco auramine series, spiropyran series, rhodamine lactam series, triphenylmethane series, triazene series, spirophthalan xanthene series, naphtholactam series, and azomethine series.

Specific examples of the leuco dye include, but not limited to, 9-(N-ethyl-N-isopentylamino)spiro[benzo[a]xanthene-12,3'-phthalide], 2-methyl-6-(Np-tolyl-N-ethylamino)fluoran-6-(diethylamino)-2-[(3-trifluoromethyl)anilino]xanthene-9-spiro-3'-phthalide, 3,3-bis(p-diethylaminophenyl)-6-diethylamino phthalide, 2'-anilino-6'-(dibutylamino)-3'-methylspiro[phthalide-3,9'-xanthene], 3-(4-diethylamino-2-methylphenyl)-3-(1-ethyl-2-methylindole-3-yl)-4-azaphthalide, and 1-ethyl-8-[N-ethyl-N-(4-methylphenyl)amino]-2,2,4-trimethyl-1,2-dihydrospiro[11H-chromeno[2,3-g]quinoline-11,3'-phthalide].

Such leuco dyes may be used singly or in combination. A color tone of the temperature-indicating ink in a colored state as described later can be regulated by combining two or more leuco dyes.

The color-developing agent is a compound including an electron acceptor, which is bonded with an electron-donating leuco dye for color developing of the leuco dye. Examples of the color-developing agent include one used as a color-developing agent for pressure sensitive copying paper or thermal paper.

Specific examples of the color-developing agent include, but not limited to, phenols such as benzyl 4-hydroxybenzoate, 2,2'-biphenol, 1,1-bis(3-cyclohexyl-4-hydroxyphenyl)cyclohexane, 2,2-bis(3-cyclohexyl-4-hydroxyphenyl)propane, bisphenol A, bisphenol F, bis(4-hydroxyphenyl)sulfide, para-hydroxybenzoate, and gallic acid ester; metallic salts of carboxylic acid derivatives; salicylic acid and salicylate metal salts; sulfonic acids; sulfonate metal salts; phosphoric acids; phosphate metal salts; acid phosphate esters; acid phosphate metal salts; phosphorous acids; and phosphite metal salts.

The color-developing agent preferably includes agents highly compatible with the leuco dye or the decolorant as described below, and more preferably includes organic color-developing agents such as 2,2'-biphenol, bisphenol A, and gallic acid esters.

Such color-developing agents may be used singly or in combination. A color density of the temperature-indicating ink in a colored state can be regulated by combining two or more color-developing agents.

The amount of the color-developing agent with respect to the leuco dye can be appropriately set depending on the color density. For example, the color-developing agent may be set within a range from 0.1 to 100 mass parts with respect to 1 mass part of the leuco dye.

The decolorant, which is a compound to dissociate the bond of the leuco dye and the color-developing agent, controls the color-developing start temperature and the decoloring start temperature of the leuco dye. Examples of the decolorant include one used as a decolorant for pressure sensitive copying paper or thermal paper. The decolorant is solidified and phase-separated from the leuco dye and the decolorant within a temperature range in which the colored state of the leuco dye is maintained. In other words, the bond of the leuco dye and the color-developing agent is maintained, thereby the temperature-indicating ink maintains the colored state as described later.

The decolorant is melt and dissociates the bond of the leuco dye and the color-developing agent within a temperature range in which the decolored state of the leuco dye is maintained. In other words, the dissociating state of the leuco dye and the color-developing agent is maintained, thereby the temperature-indicating ink maintains the decolored state as described later.

Specifically, the temperature-indicating ink starts color developing at the timing when temperature of the decolorant becomes equal to or lower than the freezing point, and starts decoloring at the timing when temperature of the decolorant becomes equal to or lower than the melting point.

In the fourth embodiment, "colored state" of the temperature-indicating ink means a state where the color density of the temperature-indicating ink is highest. Further, "decolored state" of the temperature-indicating ink means a state where the color density of the temperature-indicating ink is lowest. The color density can be represented by lightness among hue, lightness, and chroma as color components. Hence, when the color density is determined with reference to a color tone, the color density is defined by lightness between lightness and chroma as components of the color tone.

A decolorant having a temperature difference between the freezing point and the melting point is selected as the decolorant in the fourth embodiment. Specific examples of the decolorant in the fourth embodiment include, but not limited to, fatty acid ester compounds such as isopropyl myristate, isopropyl palmitate, tricaprilin, tricaprin, trilaurin, and trimyristin. In addition, other esters, alcohols, ethers, ketones, amides, azomethines, fatty acids, hydrocarbons, and the like may also be used.

Although the decolorants can be used singly, use of the two or more decolorants in combination makes it possible to regulate the freezing point and the melting point. The amount of the decolorant with respect to the leuco dye can be appropriately set depending on the color density of the leuco dye. For example, the decolorant may be set within a range from 1 to 800 mass parts with respect to 1 mass part of the leuco dye.

The non-color-developing material is added to hold the leuco dye, the color-developing agent, and the decolorant on a product to be managed when they are printed on the product, and protect them from atmospheric gas such as carbon dioxide or oxygen, water, and ultraviolet rays.

Figure 8A:
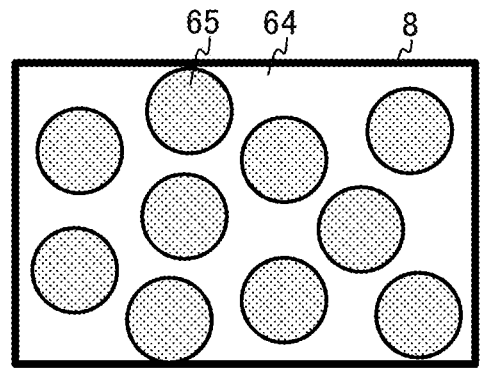
FIGS. 8A to 8D schematically show a printed matter using a temperature-indicating ink and a change in the printed matter with respect to detection temperature.
Figure 8B:
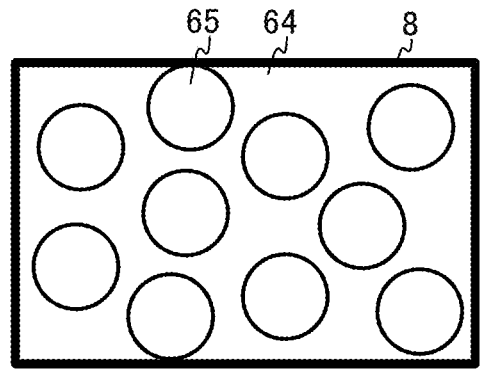

FIGS. 8A to 8D schematically show a printed matter using the temperature-indicating ink and change with detection temperature. FIG. 8A is a schematic view showing a state of a temperature-indicating ink 8 in a colored state, in which a non-color-developing material 64 holds a composition 65 including a Leuco dye, a color-developing agent, and a decolorant. FIG. 8B is a schematic view showing a state of the temperature-indicating ink 8 in a decolored state, in which the non-color-developing material 64 holds the composition 65 including the Leuco dye, the color-developing agent, and the decolorant.

As shown in FIG. 8A and the non-color-developing material 64 holds the composition 65 including the Leuco dye, the color-developing agent, and the decolorant in a dispersed manner. In other words, the non-color-developing material 64 is solid, and a phase including the composition 65 including the Leuco dye, the color-developing agent, and the decolorant forms a phase separation structure in which the phase is dispersed in a phase including the non-color-developing material 64 at the predetermined temperature. FIG. 8A and schematically show a state where the isotropic, spherical composition 65 is dispersed in the non-color-developing material 64 like microcapsule or emulsion, for example. The temperature-indicating ink 8 containing such an isotropic, spherical composition 65 may be configured to have an interfacial layer between the two phases, i.e., the phase including the composition 65 and the phase including the non-color-developing material 64, in order to prevent coalescence between the compositions 65, maintain the dispersed state, and secure environmental resistance. Another possible structure may include, but not limited to, a structure where the non-color-developing material 64 is a high-viscosity liquid and an interfacial layer is formed by, for example, a surfactant to hold the temperature-indicating ink 8. Further, marking may be performed while the temperature-indicating ink is stirred by a magnetic stirrer in the housing unit 61 in order to maintain the dispersed state.

Figure 8C:
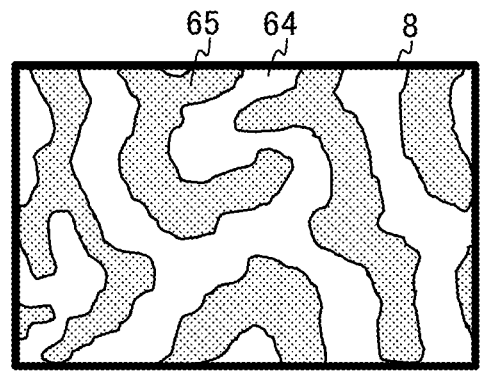
Figure 8D:
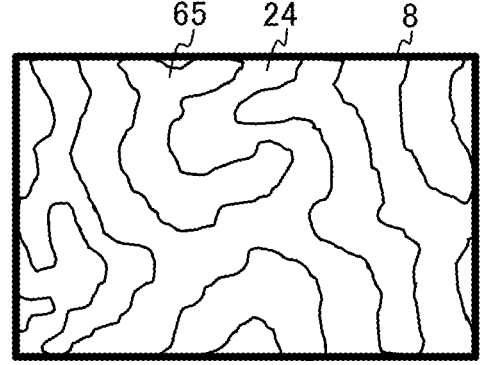

FIGS. 8C and 8D are each a schematic view showing a structure of a temperature-indicating ink 8 in a colored state, in which the non-color-developing material 64 and the composite 65 are continuously separated from each other, where FIG. 8C shows a colored state of the temperature-indicating ink 8, and FIG. 8D shows a decolored state thereof. The temperature-indicating ink 8 forms an anisotropic (amorphous) continuous phase including the composite 65, which includes the leuco dye, the color-developing agent, and the decolorant, and the non-color-developing material 64. A phase including the composite 65 including the leuco dye, the color-developing agent, and the decolorant is anisotropically (amorphously) dispersed in a continuous layer including the non-color-developing material 64. The dispersed state shown in FIGS. 8C and 8D tends to occur when a concentration ratio of the non-color-developing material 64 to the composite 65 is similar to 1:1.

The non-color-developing material 64 (hereinafter, the sign 64 is omitted) is not an electronic acceptor unlike the color-developing agent, and does not exhibit a color-developing property to the leuco dye when being mixed with the leuco dye, the color-developing agent, and the decolorant. The non-color-developing material does not deteriorate the decoloring property of the decolorant to the leuco dye.

The melting point of the non-color-developing material is higher than the melting point of the composite (mixture) including the leuco dye, the color-developing agent, and the decolorant. The non-color-developing material in a solid or coagulated state is poorly compatible with each of the leuco dye, the color-developing agent, and the decolorant.

The non-color-developing material satisfying such conditions preferably has few polar groups. Such a material includes a nonpolar material, such as a resin including only hydrocarbon, and silicone resin.

Specific examples of the non-color-developing material include waxes of paraffin series, microcrystalline series, olefin series, polypropylene series, polyethylene series, and the like; and resins such as polypropylene, polyethylene, polystyrene, cycloolefin, polysiloxane, melamine resin, urea resin, formaldehyde resin, copolymers of them, polyvinyl alcohol, and polyacrylic acid.

The content of the non-color-developing material in the temperature-indicating ink 8 is set within a range from 30 to 99 mass %. The content of the non-color-developing material in the temperature-indicating ink 8 is preferably 40 to 70 mass % in consideration of detection performance for detecting a change in color density and a change in resistance value of the temperature-indicating ink 8 as described later.

According to the temperature-indicating ink 8 containing such a nonpolar material, as shown in FIG. 8(b), even if the decolorant is melt and the temperature-indicating ink 8 is in a decolored state, a shape of the temperature-indicating ink 8 is more securely held on a product to be managed.

Temperature Management Using Temperature-Indicating Material

A product and the temperature-indicating ink 8 applied to the product are thermally influenced by the outside and ambient temperature under temperature management environment in cold chain or the like. As described above, the temperature-indicating ink 8 changes its light absorption characteristics depending on color developing or decoloring of the leuco dye at a predetermined temperature. With the color change of the temperature-indicating ink 8, i.e., color developing and decoloring, for example, the color-developing start temperature of the leuco dye depends on the freezing point of the decolorant, and the decoloring start temperature thereof depends on the melting point of the decolorant.

Figure 9:
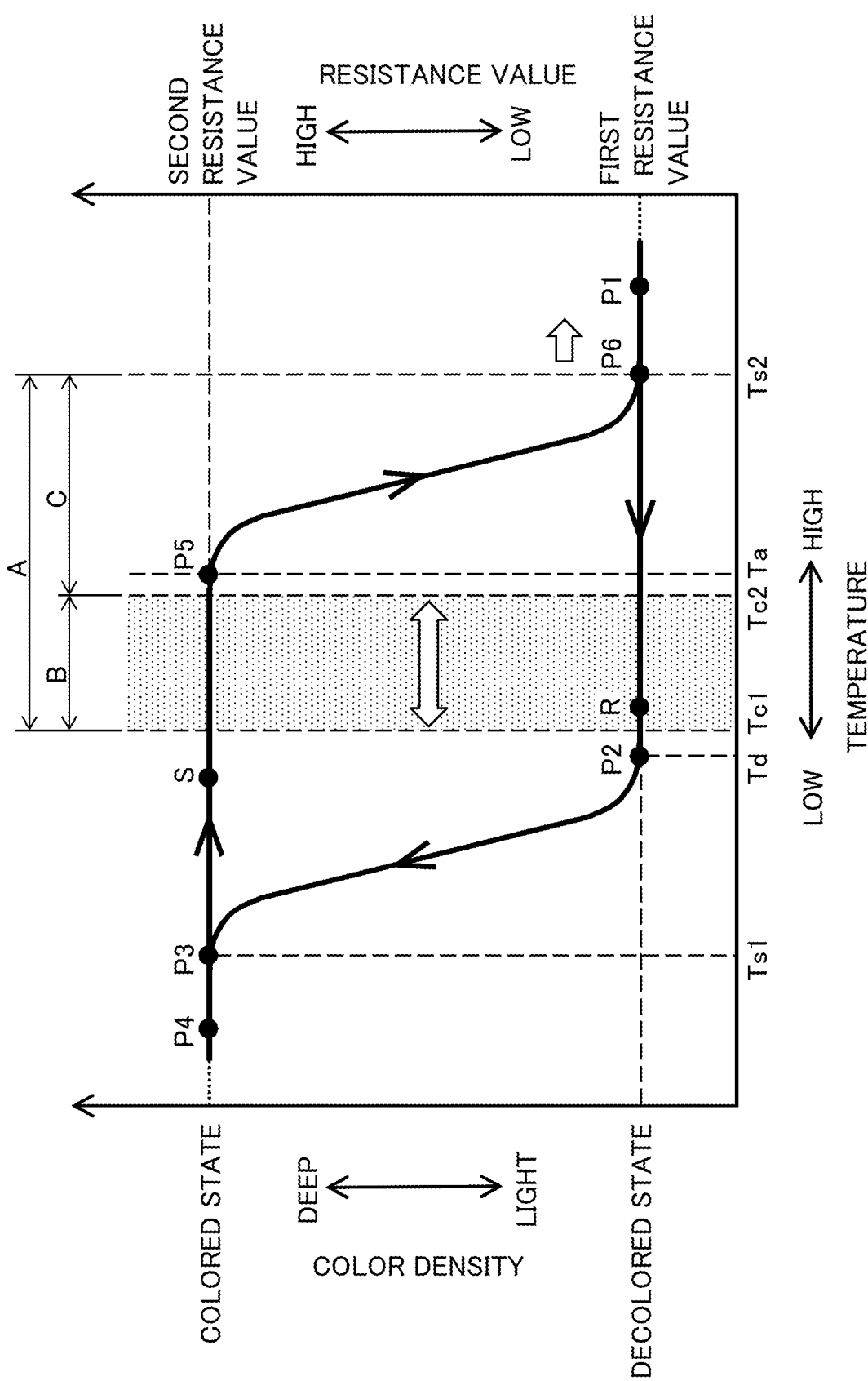
FIG. 9 shows a relationship between temperature and an optical state of a temperature-indicating ink according to a fourth embodiment.

FIG. 9 shows a relationship between temperature and an optical state of the temperature-indicating ink 8 according to the fourth embodiment. FIG. 9 is a graph showing a relationship between temperature of the temperature-indicating ink 8 and color density or a resistance value of the temperature-indicating ink 8. In FIG. 9, the horizontal axis shows the temperature of the temperature-indicating ink 8, the left vertical axis shows the color density thereof, and the right vertical axis shows the resistance value thereof. In FIG. 9, Ta represents the melting point of the decolorant, corresponding to the decoloring start temperature of the temperature-indicating ink 8. Td represents the freezing point of the decolorant, corresponding to the color-developing start temperature of the temperature-indicating ink 8. In FIG. 9, a sign A represents a temperature management region in cold chain. A sign B in the temperature management region A represents a temperature control region in which temperature is controlled to a beforehand set temperature by predetermined refrigeration cycle equipment. A sign C in the temperature management region A represents a cold storage temperature region allowed for adiabatic cold storage without the refrigeration cycle equipment in a cold chain process.

As shown in FIG. 9, the temperature-indicating ink 8 in the fourth embodiment shows color density hysteresis and resistance value hysteresis in accordance with temperature change. The color density hysteresis is now described.

As temperature lowers from a state P1 at which the decolorant is melt and the leuco dye is dissociated from the decolorant, the temperature-indicating ink 8 remains in a decolored state until the freezing point Td (color-developing start temperature) of the decolorant. In other words, the color density of the temperature-indicating ink 8 remains lowest. In FIG. 9, P2 denotes a state of the temperature-indicating ink 8 that has reached the freezing point Td of the decolorant while remaining in the decolored state.

Subsequently, when temperature of the temperature-indicating ink 8 in the state P2 becomes equal to or lower than the freezing point Td of the decolorant, the decolorant starts to be solidified and is gradually separated from the leuco dye and the color-developing agent. In other words, the leuco dye and the color-developing agent start to be bonded together, and thus the temperature-indicating ink 8 starts to be color-developed.

As the temperature of the temperature-indicating ink 8 further lowers, separation of the decolorant due to solidification and crystallization further proceeds together with proceeding of bonding of the leuco dye and the color-developing agent, and thus the color density of the temperature-indicating ink 8 gradually becomes higher. As the temperature of the temperature-indicating ink 8 still further lowers, the color density increases at a slow rate, and decreases beyond a first saturation temperature Ts1 as a predetermined temperature. As a result, the color density no longer increases, i.e., is saturated. Specifically, the decolorant is completely solidified and separated, resulting in complete bonding of the leuco dye and the color-developing agent. Consequently, the color density of the temperature-indicating ink 8 becomes highest.

Hereinafter, Ts1 is referred to as first saturation temperature. In FIG. 9, P3 denotes a state of the temperature-indicating ink 8 that has reached the first saturation temperature Ts1. When the temperature-indicating ink 8 reaches the first saturation temperature Ts1 and becomes in the state P3, the temperature-indicating ink 8 remains in the colored state with the deepest color even if it becomes in a state P4 at a temperature lower than the first saturation temperature Ts1.

On the other hand, as the temperature rises from the state P4 in which the decolorant is solidified and the leuco dye and the color-developing agent bond together, the temperature-indicating ink 8 remains in the colored state until the melting point Ta (decoloring start temperature) of the decolorant. In other words, the temperature-indicating ink 8 in the state P4 does not return from the state P3 to the state P2 (is not decolored), and the color density of the temperature-indicating ink 8 remains highest.

In FIG. 9, P5 denotes a state of the temperature-indicating ink 8 that has reached the melting point Ta of the decolorant while remaining in the colored state. Subsequently, when temperature of the temperature-indicating ink 8 in the state P5 becomes equal to or higher than the melting point Ta of the decolorant, the decolorant starts to be melt and gradually dissociates the leuco dye from the color-developing agent. In other words, bond of the leuco dye with the color-developing agent is broken, and thus the temperature-indicating ink 8 starts to be decolored. As the temperature of the temperature-indicating ink 8 further rises, dissociation of the leuco dye from the color-developing agent further proceeds, and thus the color density of the temperature-indicating ink 8 gradually becomes lower.

As the temperature of the temperature-indicating ink 8 still further rises, the color density decreases at a slow rate, and is saturated beyond a second saturation temperature Ts2 as a predetermined temperature. Specifically, the decolorant is completely melt, resulting in complete dissociation of the leuco dye from the color-developing agent. Consequently, the color density of the temperature-indicating ink 8 becomes lowest.

Hereinafter, Ts2 is referred to as second saturation temperature. In FIG. 9, P6 denotes a state of the temperature-indicating ink 8 that has reached the second saturation temperature Ts2. When the temperature-indicating ink 8 reaches the second saturation temperature Ts2 and becomes in the state P6, the temperature-indicating ink 8 remains in the decolored state with the lightest color even if it becomes in the state P1 at a temperature higher than the second saturation temperature Ts2.

The temperature-indicating ink 8 in the state P1 does not return from the state P6 to the state P5 (is not color-developed), and the color density of the temperature-indicating ink 8 remains lowest until the freezing point Td of the decolorant as described before. In other words, a relationship between the temperature and the color density of the temperature-indicating ink 8 forms a hysteresis loop via the states P2, P3, P5, and P6.

Initialization of the temperature-indicating ink 8 is now described.

In the fourth embodiment, the temperature-indicating ink 8 forming the hysteresis loop is initialized before the temperature-indicating ink 8 is applied to a predetermined product. This makes it possible to suppress a temperature load on the product in initialization as described later. If the initialization can be performed while package presentation of a product, appropriate temperature, or a load is controlled, the temperature-indicating ink 8 may be applied after printing.

In this initialization, the temperature-indicating ink 8 is set to be in a colored state. Examples of the temperature-indicating ink 8 in the colored state include one set at a temperature lower than the first saturation temperature Ts1, and one in a state in a range from the state P3 to the state P5.

The initialization method of the temperature-indicating ink 8 includes at least a method having a step of cooling the temperature-indicating ink 8 to a predetermined temperature below the first saturation temperature Ts1. As a result, the temperature-indicating ink 8 is initialized while being in a colored state, for example, the state P4. An initialization method to allow the temperature-indicating ink 8 to be in the colored state in a range from the state P3 to the state P5 includes a step of cooling a printed matter using the temperature-indicating ink 8 to a predetermined temperature below the first saturation temperature Ts1, and a step of, after the above step, heating the temperature-indicating ink 8 to a predetermined temperature above the first saturation temperature Ts1.

Specifically, for example, when the temperature-indicating ink 8 in the decolored state as shown in R in FIG. 9 is cooled to the predetermined temperature below the first saturation temperature Ts1, the temperature-indicating ink 8 becomes in the colored state as shown in P4 as described above. Subsequently, when the temperature-indicating ink 8 is heated to the predetermined temperature above the first saturation temperature Ts1, the temperature-indicating ink 8 becomes in an initialized state S. For the temperature-indicating ink 8 that has been already in the colored state before the initialization step, the initialization step may be omitted.

Contrary to the above-described initialization through cooling, the initialization may be performed by heating the temperature-indicating ink 8 to the decolored state. Examples of the temperature-indicating ink 8 initialized by heating include one set at a temperature higher than the second saturation temperature Ts2, and one in a state between the state P6 and the state P2. Such an initialized temperature-indicating ink 8 still has the first resistance value.

Such a printed matter can be applied to a product used in a temperature management range higher than room temperature (warm storage of a product). According to the printed matter formed by marking with the temperature-indicating ink 8, temperature history of whether a product has fallen below a predetermined management temperature can be detected by determining whether a state of the temperature-indicating ink 8 changes from the decolored state to the colored state.

As described above, through selection and preparation of the temperature-indicating ink 8, a product can be managed while the temperature-indicating material and the temperature-indicating ink 8 having a display type and detection temperature more suitable for product management than those in the first to third embodiments and a selected seal impression are used to form a printed matter, and product information such as characterization is attached to the printed matter.

Fifth Embodiment

In a fifth embodiment, the marking device 60, the temperature-indicating ink 8 as a temperature-indicating material, and a marking method are different from those in the fourth embodiment. The following are such different points and effects thereof.

Marking Device

The marking device 60 of the fifth embodiment uses a printer supporting digital on-demand, which can print a letter, a numeral, or a geometric pattern according to printing information from the control management unit 14 of the controller 50, as the marking unit 63 that applies the temperature-indicating ink 8. Such a printer includes a dispenser type and an inkjet printer type, in each of which the temperature-indicating ink 8 is supplied to a nozzle of an ejection-type printer and ejected onto a product to be managed for printing, and a thermal transfer type such as a thermal fusion method and a sublimation method.

The thermal transfer type using the thermal fusion method of the fifth embodiment is constituted by printers having two types of heating mechanisms and a label pasting machine. The two types of printers include a printer that prints a two-dimensional code such as a barcode or a QR Code™ storing information from the control management unit 14, such as a one-packing casing to be managed and products housed in the casing, printing time of day, and a distribution process and a management method of the distribution process, on a label with adhesive to produce a label with a two-dimensional code; and a printer that prints a letter, a numeral, or a geometric pattern on the label with the two-dimensional code with the temperature-indicating ink 8 used for temperature management in accordance with individual printing information for each product to be managed. Hence, the two-dimensional code applied in the fifth embodiment is unique to a management object, and achieves individual specification of each object and individual management in distribution management as described later.

FIG. 10 shows an example of a barcode for one packing management according to the fifth embodiment. A label 80C is attached on the inside of a lid of a one-packing casing 6 storing a plurality of products 5. The label 80C has thereon a two-dimensional code 85 printed with a normal ink, and product quality control marks 86, 87, 88 applied using the temperature-indicating ink 8.

Temperature-Indicating Ink

The temperature-indicating ink 8 in the fifth embodiment melts by heating in the thermal-transfer-type printer, and is transferred onto a product to be managed according to information received from the control management unit 14 to form a printed matter.

The temperature-indicating ink 8 preferably has a melting point lower than heating temperature of a thermal transfer unit of the printer. The melting point is preferably 250° C. or lower in light of simplification (temperature countermeasure, heat source, or the like) of the marking device 60, and more preferably 150° C. or lower in light of reducing a load on a heating mechanism of a printing unit. Furthermore, the melting point is preferably 60 to 100° C. in consideration of a load by temperature during printing on a product to be managed and stability of adhesion against temperature and the like. Such a non-color-developing material preferably includes the above-described wax material that can be adjusted to a desired melting point through molecular weight adjustment, mixing, or the like, including paraffin series, microcrystalline series, olefin series, polypropylene series, and polyethylene series.

Marking Method

As with the third embodiment, a marking method of the fifth embodiment is a method for a case where a plurality of different-type products to be managed are collectively managed through one packing or the like, in which a temperature-indicating ink 8 suitable for temperature management is selected based on the products, and the two-dimensional code 85 and a printed matter using the temperature-indicating ink 8 are formed on a label that is then applied to the one-packing casing.

First, information from the server 200 on each of products to be managed and packed together is received by the processor 10 via the communication unit 34 of the controller 50, and sent from the processor 10 to the display device of the output unit 32. Each product to be collectively managed is thus output to the display device and displayed thereon, so that an operator can search the product. Information such as data on a storage site of each product to be managed may also be sent together from the server 200 and output to the display device and displayed thereon to efficiently search the product.

Furthermore, the server 200 may receive transportation path information in a distribution process or weather information at each storage site to record and manage such information. Consequently, it is possible to select a management temperature condition based on forecast temperature at each site to determine a temperature-indicating material. In addition, when failure occurs as described later, it is possible to investigate and analyze in detail a cause of the failure, such as temperature, a path, and time.

An operator extracts a product to be managed from a storage site based on the information output and displayed on the display device, and reads the barcode on the product by the reading unit 33, and stores each product to be managed into the one-packing casing. Each data read by the reading unit 33 is sent to the server 200 via the communication unit 34. The server 200 specifies each product to be managed from the read data, determines validity of the product to be managed, records and updates history on reading, and sends, to the controller 50, management temperature based on appropriate temperature of the product to be managed to be stored in the one-packing casing, and besides management information such as information on distribution including storage and transportation to be stored in the two-dimensional code 85 to be printed by the marking device 60. The server 200 may create an encryption code to make the information on a product or distribution management to be public or private, and may issue a common key, a public key, or a private key (secret key) to an individual sender, deliverer, or manager, and manage such a key. In addition, the server 200 may add information on the encryption code such as the public key to a two-dimensional code 85 for management.

The various types of information output from the server 200 is received by the processor 10 via the communication unit 34 of the controller 50. The processor 10 compares the management temperature from the server 200 to the detection temperature of the temperature-indicating ink 8 as the temperature-indicating material in the storage 20, and selects a temperature-indicating ink 8 to be applied to the one-packing casing 6.

The selection result of the temperature-indicating material for marking by the processor 10 is sent to the marking device 60 together with the two-dimensional code information on products and distribution management. Commodity information of a product to be managed and information on a temperature-indicating material for marking and a marking position may be sent from the processor 10 to the display device of the output unit 32.

The marking device 60 produces a label with a two-dimensional code printed based on two-dimensional code information sent from the processor 10, and selects a temperature-indicating ink 8 from the housing unit 61 based on the information on the temperature-indicating ink 8, and performs printing in a predetermined printing form at a predetermined position on the label with the two-dimensional code. After printing with the temperature-indicating ink 8, the label with the two-dimensional code is pasted at a predetermined position on the one-packing casing 6 by a label pasting machine. When a temperature management state of the one-packing casing 6 in distribution is desired to be checked, the pasting position is preferably on the outside of the one-packing casing 6 so as to be affected by ambient temperature. When a temperature load condition of a product in distribution is checked, the label is preferably pasted on the product itself or on the inside of the one-packing casing 6. In the fifth embodiment, the label is pasted on the outside of the one-packing casing 6 for distribution management as described later. After marking, the marking unit 63 outputs a signal indicating execution of marking to the processor 10.

To acquire information on the marking result, the temperature-indicating material of each marked product is read as image information together with the barcode by the detector of the reading unit 33 of the controller 50, and the image information is sent to the processor 10. The processor 10 processes information on each product to be managed and information on the marking result, and sends or outputs such information to the storage 20 for recording or storage of the information, and sends the information to the server 200 for recording via the display device of the output unit and the communication unit.

In this way, it is possible to pack a plurality of products to be managed together and manage the products by the temperature-indicating material for marking at the same temperature condition. Furthermore, use of a terminal capable of reading the two-dimensional code also makes it possible to provide product information or management information to a deliverer and a distributer, and individually manage each of casings.

Distribution Management Using Temperature-Indicating Material

Distribution management using temperature-indicating material is now described with reference to FIGS. 6 and 10. The one-packing casing 6 with the temperature-indicating material (for example, the quality control marks 86, 87, 88) and the two-dimensional code 85 is delivered by a distributor 92 to an addressee 93 through a process including transportation (transfer) and storage. The distributor 92 connects a terminal (for example, marking terminal 100) to the server 200 or reads the two-dimensional code 85 using the reading unit 33 (barcode detector) or the like to acquire information on the one-packing casing 6 and products 5 to be managed and information on specified management temperature and the like, and transports the one-packing casing 6 to the addressee 93 while managing temperature or time during transportation according to such information. Furthermore, the distributor 92 detects the two-dimensional code 85 as a unique code together with the information on a color tone of the temperature-indicating material in a process including transportation (transfer) and storage, and sends the two-dimensional code 85 to the server 200. This makes it possible to store the information, such as temperature management state of the one-packing casing 6 to be managed, a reading site, and time, into the server 200, and individually manage a state of each distribution process. The temperature management state of the one-packing casing 6 can be read by the detector of the reading unit 33 of the controller 50. It is further possible to allow participants of distribution to acquire information of inadequate management or the like from the server 200 based on a specified public key on the basis of the management information acquired in a distribution process, and manage the information in common, or prevent distribution of an inadequately managed product to the addressee 93 or specify a process in which inadequate management occurs in early times.

In addition, the addressee 93 can check a color tone state of the temperature-indicating material to visually check a temperature management state or a temperature load state of a product after a process including sending, transportation, and storage, and can read a public key beforehand given by the server 200 or the two-dimensional code 85 to check the information on management temperature or time to reception through connection with the server 200.

Sixth Embodiment

In a sixth embodiment, the marking device 60, the temperature-indicating ink 8 as a temperature-indicating material, a marking method, and a management method are different from those in the fifth embodiment. The controller 50 may not be integrated with the marking device 60 unlike in the first embodiment. The following are such different points and effects thereof.

Marking Device

As with the fifth embodiment, the marking device 60 of the sixth embodiment uses an ejection-type printer as a printer that prints a two-dimensional code giving a specific number and prints a quality control mark using the temperature-indicating ink 8. The temperature-indicating ink 8 is supplied to a nozzle of the ejection-type printer and ejected onto a product to be managed for printing. The printing method of the ejection-type printer includes an inkjet method and a dispenser method, in each of which a letter, a numeral, or a geometric pattern is printed according to printing information from the processor 10 of the controller 50. The sixth embodiment uses an inkjet-type continuous inkjet printer capable of high-speed, individual printing, as the ejection-type printer. Use of an industrial inkjet printer allows printing of several hundred to three thousand letters per second, leading to an effect of extremely improving throughput per unit time.

Temperature-Indicating Ink

The temperature-indicating ink of the sixth embodiment includes a composition containing the leuco dye, the color-developing agent, the decolorant, the non-color-developing material, and the solvent as described in the fourth embodiment, and further containing a conductive agent. The conductive agent is preferably dissolved in a predetermined solvent. It is also important that the conductive agent does not affect the color density of the temperature-indicating ink 8 used for printing on a product to be managed. An agent having a salt structure or an ionic liquid is preferably used as the conductive agent. Specifically, a complex is preferably used as the conductive agent.

The cation constituting the salt structure of the conductive agent preferably includes metal ions of group 1 and group 2, including lithium, sodium, potassium, magnesium, and calcium, and tetraalkylammonium ion. The alkyl chain of the tetraalkylammonium ion may be a linear or branched chain, and its solubility in a solvent increases with carbon number. However, a smaller carbon number is more preferred because resistance can be reduced at a slight additive rate.

The carbon number of the alkyl chain of the tetraalkylammonium ion is preferably about 2 to 8.

The anion constituting the salt structure of the conductive agent preferably includes inorganic acid ion such as nitrate ion or phosphate ion, and organic acid ion such as hexafluorophosphate ion and tetrafluoroborate ion because of their high solubility in a solvent.

Specific examples of the conductive agent include tetraethylammonium hexafluorophosphate, tetrapropylammonium hexafluorophosphate, tetrabutylammonium hexafluorophosphate, tetrapentylammonium hexafluorophosphate, tetrahexylammonium hexafluorophosphate, tetraoctylammonium hexafluorophosphate, tetraethylammonium tetrafluoroborate, tetrapropylammonium tetrafluoroborate, tetrabutylammonium tetrafluoroborate, tetrapentylammonium tetrafluoroborate, tetrahexylammonium tetrafluoroborate, and tetraoctylammonium tetrafluoroborate.

Conductive solid particles of, for example, carbon or silver may also be used as the conductive agent. The particle size of the conductive solid particles is preferably equal to or lower than 100 μm or less in light of visibility for determining the color density of the temperature-indicating ink 8, and more preferably equal to or lower than 1 μm or less in light of dispersion stability of the conductive solid particles. The content of the conductive agent in the temperature-indicating ink 8 is preferably 0.01 to 20 mass %.

The resistivity (at normal temperature) of the temperature-indicating ink 8 containing such amount of the conductive agent can be set to 10000 Ω/cm or less, preferably 2000 Ω/cm or less.

Marking Method

The marking device 60 of the sixth embodiment is implemented in a production line of a mass production factory. The product to be managed in the sixth embodiment is subjected to mass production and mass distribution, and is marked with a two-dimensional code with a normal ink and a quality control mark with the temperature-indicating ink 8 as the temperature-indicating material at a specified position of a product to be managed on a manufacturing line. A detailed process is described below.

The server 200 sends, to the controller 50, product information on a large number of products to be managed on a production line, information on management of distribution including storage and transportation, and information on manufacturing such as a manufacturing lot, a manufacturing line, and manufacturing time of day.

The various types of information output from the server 200 are received by the processor 10 via the communication unit 34 of the controller 50. The processor 10 refers the information from the server 200 on distribution management of the product to be managed and information stored in the storage 20 on the temperature-indicating inks 8 housed in the housing unit 61 of the marking device 60, and based on such information, selects a temperature-indicating ink 8 having a detection condition suitable for distribution including storage or transportation of a product to be managed from among the housed temperature-indicating inks 8 as the temperature-indicating materials. The server 200 may store the information on the temperature-indicating inks 8 so that the temperature-indicating ink 8 used for temperature management within the server 200 is selected based on the information on distribution management and output to the processor 10 of the controller 50 together with other types of information.

The processor 10 creates pattern data of the two-dimensional code for final printing based on the product information, the distribution management information, the manufacturing information (for example, manufacturing date, factory information, line information, and lot information), and the information on the temperature-indicating ink.

The selection result of the temperature-indicating ink 8 for temperature management by the processor 10 and the pattern data of the two-dimensional code are sent to the marking device 60. The marking device 60 selects the normal ink or the temperature-indicating ink 8 from the housing unit 61 based on the information received from the processor 10, and marks a product to be managed with a two-dimensional code using a normal ink and with a quality control mark using the temperature-indicating ink 8 by an inkjet printer as the marking unit 63. In the marking, an optical sensor or the like detects that a product on a production line passes through a printing nozzle head portion of the inkjet printer, and the two-dimensional code and the quality control mark are printed at a specified position of the product. To further add management information, a printing pattern of a letter, a numeral, a code, a geometric pattern, or a combination thereof may be created as the quality control mark by the server 200, and printed on the product for distribution management.

After marking, the marking unit 63 outputs a signal indicating execution of marking to the processor 10. Marking results including a marking state are acquired by an image inspection device on the production line and output to the processor 10. The processor 10 processes the information on the product to be managed and the information on the marking results, and sends such processed information to the server 200 for recording via the display device of the output unit 32 and the communication unit 34.

Consequently, a producer, a deliverer, and a distributer can easily perform, via the server 200, input/output processing on results of the marking operation to the large number of products to be managed. Further, the producer can perform temperature management in a manufacturing process such as a production line, distribution management, and management of shipping-available and effective production amount in real time.

The marking system MS of the sixth embodiment includes the marking device 60 including the marking unit 63 that applies a quality control mark of a product, the housing unit 61 that houses at least one temperature-indicating material, and the providing unit 62 that supplies a temperature-indicating material selected from the housing unit 61 to the marking unit 63, and the controller 50 including the storage 20 storing temperature-indicating material information on color-developing temperature and/or decoloring temperature of each temperature-indicating material contained in the housing unit 61, and the processor 10 that acquires appropriate temperature of a product from the server 200 or the input unit 31, selects a temperature-indicating material based on the acquired appropriate temperature of the product and the temperature-indicating material information, and informs the providing unit 62 of supply of the selected temperature-indicating material. Consequently, a temperature-indicating material suitable for a product is selected, and the temperature-indicating material is applied to the product so that distribution management of the product is achieved.

The temperature-indicating material is a temperature-indicating seal, and the marking unit 63 is a pasting machine to paste the temperature-indicating seal. This makes it possible to select a temperature-indicating material suitable for a product, and easily apply the temperature-indicating material to the product.

When a plurality of products are packed together in one package, the processor 10 can select a temperature-indicating material suitable for an overlapped temperature zone of appropriate temperatures of the products.

When a plurality of products are packed together in one package, and when the processor 10 cannot select a temperature-indicating material suitable for the overlapped temperature zone of the appropriate temperatures of the products, the processor 10 can select the temperature-indicating material based on an appropriate temperature of a preferential product acquired from the server 200 or the input unit 31. Consequently, a temperature-indicating material suitable for a product can be selected.

The temperature-indicating material is the temperature-indicating ink 8, the marking unit 63 is a stamping machine, and the providing unit 62 can supply the temperature-indicating ink 8 to an impression surface of a seal impression of the stamping machine.

The temperature-indicating material is the temperature-indicating ink 8, the marking unit 63 is an ejection-type printer that ejects the temperature-indicating ink, and the providing unit 62 can supply the temperature-indicating ink 8 to a nozzle of the ejection-type printer.

The marking unit 63 can print an identification code (for example, two-dimensional code) as management information of the product on a label by a normal ink instead of the temperature-indicating ink 8, and can apply a quality control mark of the product on the label by the selected temperature-indicating ink.

The temperature-indicating ink 9 includes a composition containing a leuco dye, a color-developing agent, a decolorant, and a non-color-developing material. The temperature-indicating ink 8 includes a composition further containing a conductive agent.

Although it has been described that the marking terminal 100 of the sixth embodiment includes the controller 50 and the marking device 60, this is not limitative. The marking device 60 may include the controller 50. Specifically, the marking device 60 of the sixth embodiment may include the marking unit 63 that applies a quality control mark of a product, the housing unit 61 that houses at least one temperature-indicating material, the providing unit 62 that supplies a temperature-indicating material selected from the housing unit 61 to the marking unit 63, the storage 20 storing temperature-indicating material information on color-developing temperature and/or decoloring temperature of each temperature-indicating material contained in the housing unit 61, and the processor 10 that acquires appropriate temperature of a product from the server 200 or the input unit 31, selects the temperature-indicating material based on the acquired appropriate temperature of the product and the temperature-indicating material information, and informs the providing unit of supply of the selected temperature-indicating material.

LIST OF REFERENCE SIGNS

5 Product
8 Temperature-indicating ink
10 Processor
11 Barcode processor
12 Product information acquisition unit
13 Temperature-indicating material selection unit
14 Control management unit
20 Storage
21 Temperature-indicating material information
22 Product information
23 Selected temperature-indicating material information
24 Marking processing information
25 Product identification information
31 Input unit 32 Output unit (display unit, display device)
33 Reading unit
34, 35 Communication unit
50 Controller
60 Marking device
61 Housing unit
62 Providing unit
63 Marking unit
64 Non-color-developing material
65 Composition
70 Casing
71 Handle portion
75 Switch
76 Push button
80 Label
81 One-dimensional barcode
82, 83 Temperature-indicating seal (quality control mark)
85 Two-dimensional barcode
86, 87, 88 quality control mark
91 Sender
92 Distributer
93 Addressee
100 Marking terminal
200 Server
221 Product information
210 Processor
220 Storage
MS Marking system
NW Network
Td Freezing point
Ta Melting point

The invention claimed is:

1. A marking system, comprising:
a marking device which includes: a marking unit that applies a quality control mark of a product; a housing unit that houses at least one temperature-indicating material; and a providing unit that supplies a temperature-indicating material selected from the housing unit to the marking unit; and
a controller which includes: a storage storing temperature-indicating material information on color-developing temperature and/or decoloring temperature of each temperature-indicating material contained in the housing unit; and a processor that acquires appropriate temperature of the product from a server or an input unit, selects the temperature-indicating material based on the acquired appropriate temperature of the product and the temperature-indicating material information, and informs the providing unit of supply of the selected temperature-indicating material;
wherein when a plurality of products are packed together in one package, the processor selects a temperature-indicating material suitable for an overlapped temperature zone of appropriate temperatures of the products.

2. The marking system according to claim 1, wherein the temperature-indicating material is a temperature-indicating seal, and
the marking unit is a pasting machine to paste the temperature-indicating seal.

3. The marking system according to claim 1, wherein the temperature-indicating material is a temperature-indicating ink,
the marking unit is a stamping machine, and
the providing unit supplies the temperature-indicating ink to an impression surface of a seal impression of the stamping machine.

4. The marking system according to claim 1, wherein the temperature-indicating material is a temperature-indicating ink,
the marking unit is an ejection-type printer that ejects the temperature-indicating ink, and
the providing unit supplies the temperature-indicating ink to a nozzle of the ejection-type printer.

5. The marking system according to claim 1, wherein the temperature-indicating material is a temperature-indicating ink, and
the marking unit prints an identification code as management information of the product on a label by a normal ink instead of the temperature-indicating ink, and applies a quality control mark of the product to the label by the selected temperature-indicating ink.

6. The marking system according to claim 1, wherein the temperature-indicating material is a temperature-indicating ink, and
the temperature-indicating ink includes a composition containing a leuco dye, a color-developing agent, a decolorant, and a non-color-developing material.

7. The marking system according to claim 6, wherein the temperature-indicating ink includes a composition further containing a conductive agent.

8. A marking system, comprising:
a marking device which includes: a marking unit that applies a quality control mark of a product; a housing unit that houses at least one temperature-indicating material; and a providing unit that supplies a temperature-indicating material selected from the housing unit to the marking unit; and
a controller which includes: a storage storing temperature-indicating material information on color-developing temperature and/or decoloring temperature of each temperature-indicating material contained in the housing unit and a processor that acquires appropriate temperature of the product from a server or an input unit, selects the temperature-indicating material based on the acquired appropriate temperature of the product and the temperature-indicating material information, and informs the providing unit of supply of the selected temperature-indicating material;
wherein when a plurality of products are packed together in one package, and when the processor does not select the temperature-indicating material suitable for an overlapped temperature zone of appropriate temperatures of the products, the processor selects the temperature-indicating material based on an appropriate temperature of a preferential product acquired from the server or the input unit.

9. A marking device comprising:
a marking unit which applies a quality control mark of a product;
a housing unit which houses at least one temperature-indicating material;
a providing unit which supplies a temperature-indicating material selected from the housing unit to the marking unit;
a storage which stores temperature-indicating material information on color-developing temperature and/or decoloring temperature of each temperature-indicating material contained in the housing unit; and
the processor which acquires appropriate temperature of the product from a server or an input unit, selects the temperature-indicating material based on the acquired appropriate temperature of the product and the temperature-indicating material information, and informs the providing unit of supply of the selected temperature-indicating material;

wherein when a plurality of products are packed together in one package, the processor selects a temperature-indicating material suitable for an overlapped temperature zone of appropriate temperatures of the products.

* * * * *